United States Patent
Asada

(10) Patent No.: US 7,755,692 B2
(45) Date of Patent: *Jul. 13, 2010

(54) IMAGE PICKUP APPARATUS HAVING CONTROLLED START-UP

(75) Inventor: Satoshi Asada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

This patent is subject to a terminal disclaimer.

(21) Appl. No.: 11/256,998

(22) Filed: Oct. 25, 2005

(65) Prior Publication Data

US 2006/0146146 A1 Jul. 6, 2006

Related U.S. Application Data

(62) Division of application No. 10/210,058, filed on Aug. 2, 2002, now Pat. No. 7,038,718.

(30) Foreign Application Priority Data

Aug. 8, 2001 (JP) ............................. 2001-240586

(51) Int. Cl.
*H04N 5/222* (2006.01)
*H04N 5/225* (2006.01)

(52) U.S. Cl. .................... 348/333.01; 348/207.99

(58) Field of Classification Search .............. 348/231.3, 348/231.4, 241, 280, 283, 312, 222.1, 333.01, 348/333.11, 333.12, 333.13, 207.99
See application file for complete search history.

(56) References Cited

U.S. PATENT DOCUMENTS

| 5,072,300 A | * | 12/1991 | Anderson | .................... 348/626 |
| 5,835,136 A | | 11/1998 | Watanabe et al. | ......... 348/231.9 |
| 6,219,489 B1 | * | 4/2001 | Ohta et al. | .................. 386/117 |
| 6,804,300 B1 | * | 10/2004 | Hoshino et al. | .......... 375/240.1 |
| 7,038,718 B2 | * | 5/2006 | Asada | ..................... 348/231.4 |
| 2002/0109781 A1 | | 8/2002 | Asada | ..................... 348/240.1 |

* cited by examiner

*Primary Examiner*—Jason Chan
*Assistant Examiner*—Nicholas G Giles
(74) *Attorney, Agent, or Firm*—Fitzpatrick, Cella, Harper & Scinto

(57) ABSTRACT

An image pickup apparatus of the present invention can eliminate the trouble of starting up the image pickup apparatus once to change settings in order to turn off a start-up picture image and mute start-up sound or operation sound. A method of controlling the same, a program for the method and a storage medium having the program stored therein all can attain such technological advantages. Start-up sound, operation sound after the start-up and display of a start-up picture image of the image pickup apparatus are inhibited by depressing a predetermined button in starting up the image pickup apparatus.

1 Claim, 6 Drawing Sheets

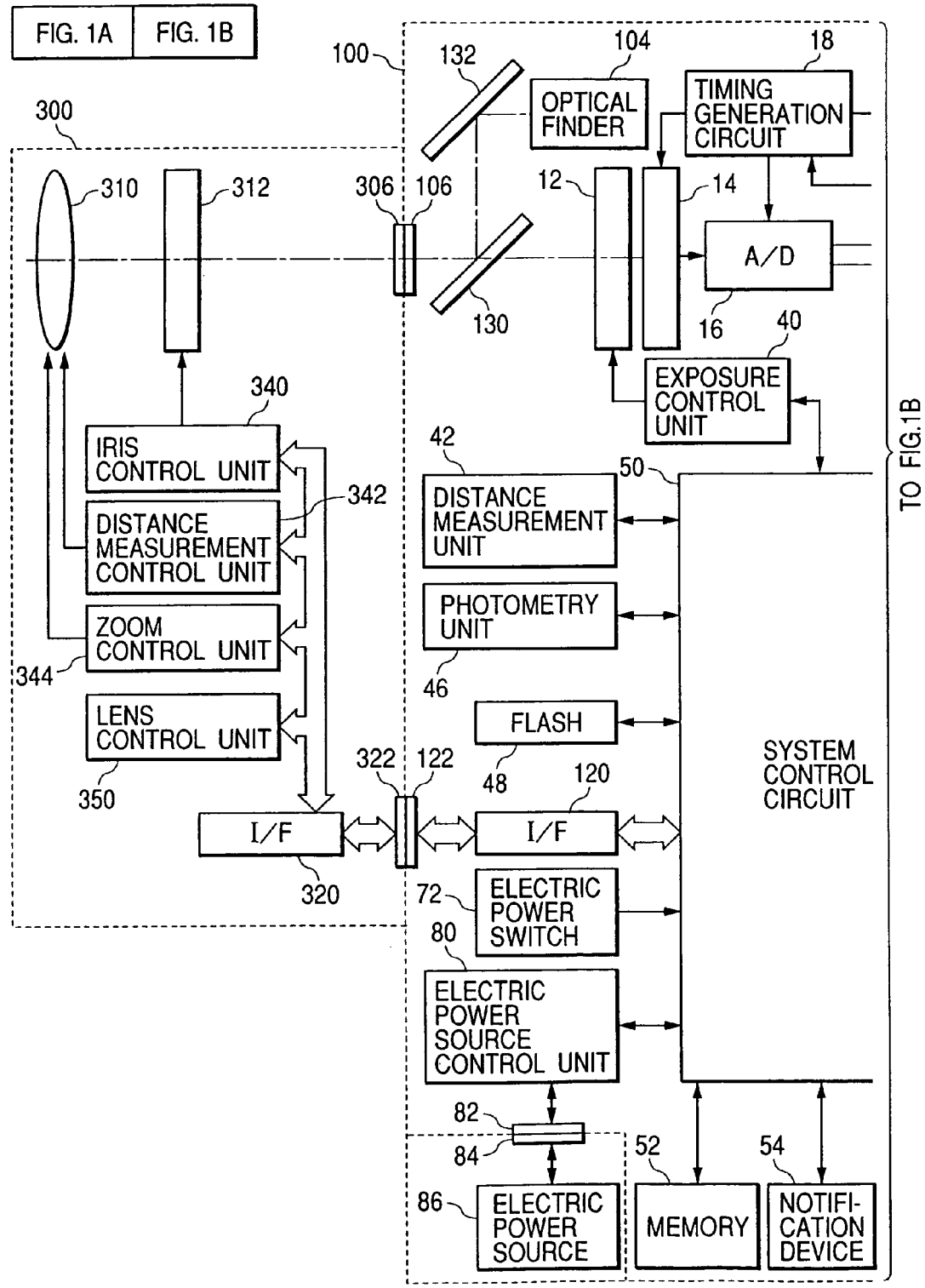

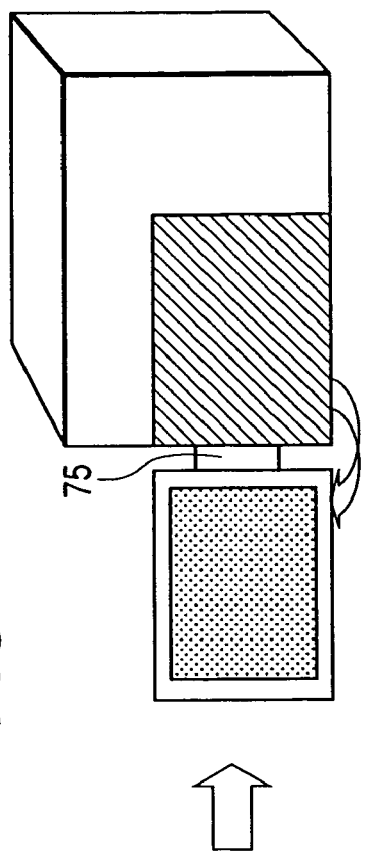
FIG. 7B
FIG. 7A
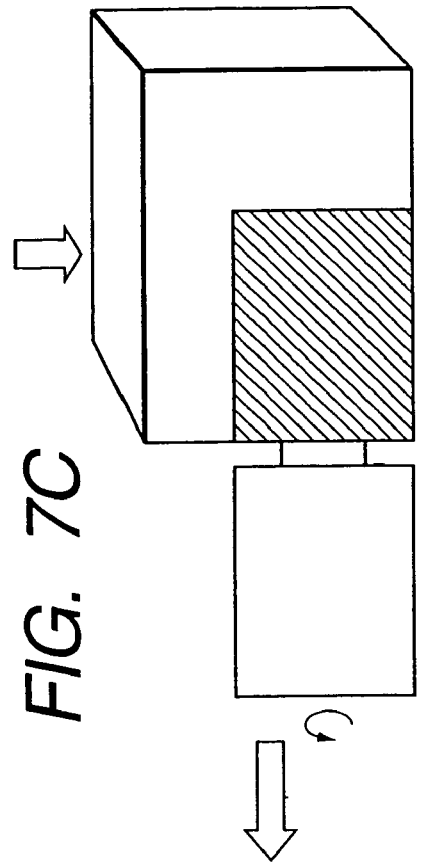
FIG. 7C
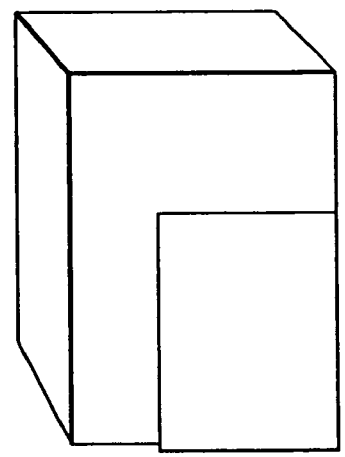
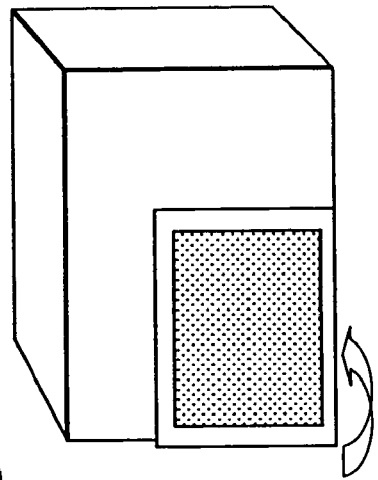
FIG. 7D

IMAGE PICKUP APPARATUS HAVING CONTROLLED START-UP

This application is a divisional of U.S. patent application Ser. No. 10/210,058, filed on Aug. 2, 2002, now U.S. Pat. No. 7,038,718 now pending.

BACKGROUND OF THE INVENTION

1. Field of the Invention

The present invention relates to an image pickup apparatus for outputting start-up sound, operation sound and the like or displaying a start-up picture image.

2. Related Background Art

Conventionally, start-up of an image pickup apparatus may take a long time. In order to remedy such trouble, a start-up picture image may be displayed on a display or start-up sound may be outputted.

However, there are situations in which it is not desired to output sound or situations in which it is not desired to display a start-up picture image in starting up and operating an image pickup apparatus. Such situations include operation in a conference or a theater. In such case, conventionally, it is often possible to set the image pickup apparatus so as to mute the sound or not to display a start-up picture image by starting up the image pickup apparatus once and changing settings. However, in this case, it is inevitable that the start-up picture image is displayed or start-up sound and operation sound are outputted once in order to turn off the start-up picture image and mute start-up sound and operation sound. Therefore, in starting up and operating the image pickup apparatus, if it is known that an operator will be in a situation in which it is not desired to output sound or it is not allowed to display the start-up picture image, it may be troublesome to start up the image pickup apparatus and change settings once in advance before such a situation occurs.

SUMMARY OF THE INVENTION

The present invention has been made under such conditions, and an object thereof is to provide an image pickup apparatus that eliminates the trouble of starting up the image pickup apparatus once to change settings in order to turn off a start-up picture image and mute start-up sound or operation sound, a method of controlling the same, a program for the method, and a storage medium having the program stored therein.

According to an embodiment of the present invention, there is provided an image pickup apparatus comprising:

an output unit, arranged to output sound; and a control unit, arranged to detect a state of a predetermined member at the time when the image pickup apparatus is started up, and inhibit output of sound indicating the start-up of the image pickup apparatus by the output unit, in accordance with a result of the detection.

Other objects and characteristics of the present invention will be apparent from the following specification and the accompanying drawings.

BRIEF DESCRIPTION OF THE DRAWINGS

FIGS. 7A, 7B, 7C and 7D are external views of an image pickup apparatus of a third embodiment.

DESCRIPTION OF THE PREFERRED EMBODIMENTS

An embodiment mode of the present invention will be hereinafter described more specifically referring to embodiments of an image pickup apparatus. Note that the present invention is not limited to a form of an apparatus but can be implemented in a form of a method, a form of a program for realizing the method, and a form of a storage medium such as a CD-ROM having the program stored therein.

First Embodiment

Figure 1B:
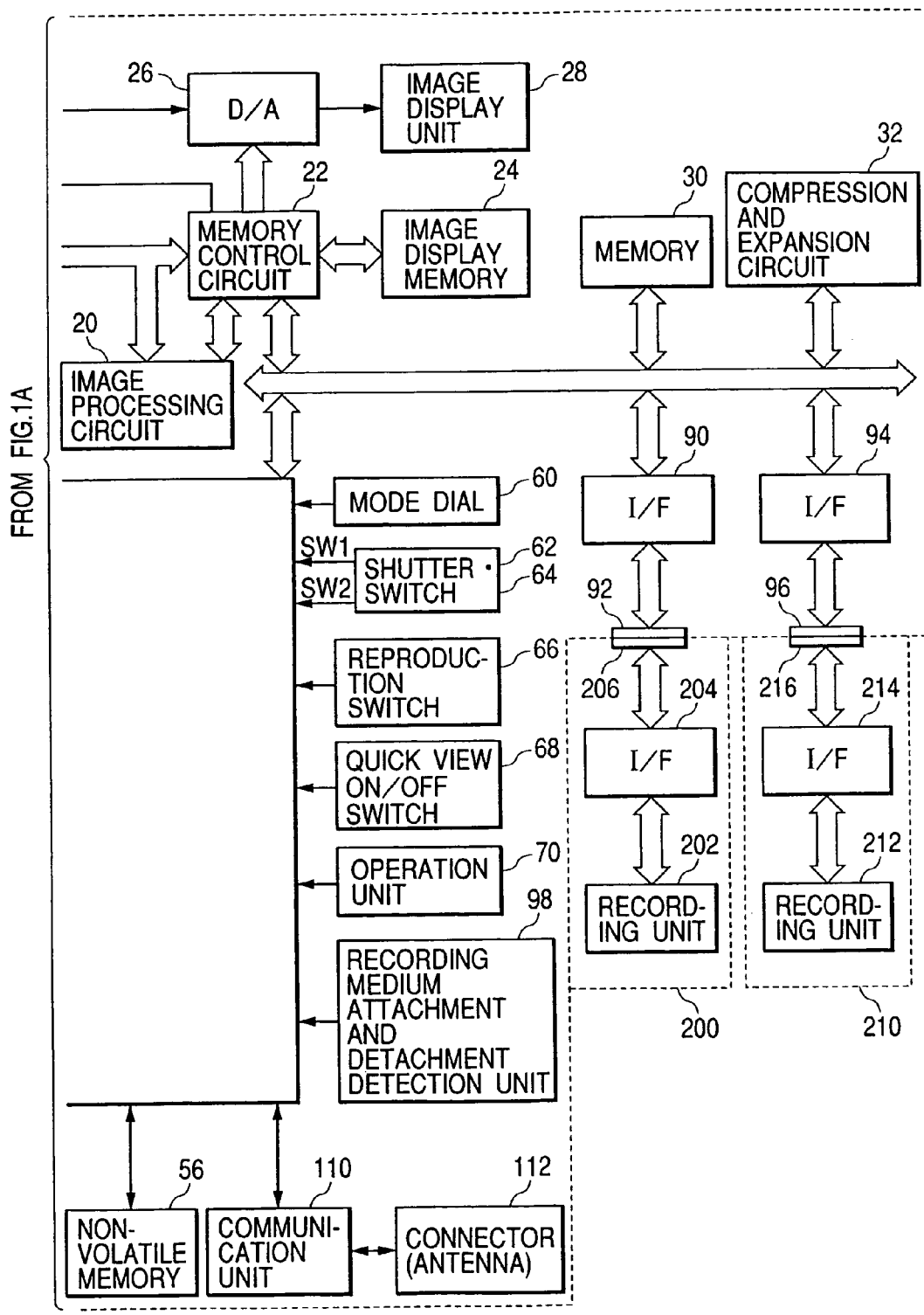
FIG. 1, composed of FIGS. 1A and 1B, is a block diagram showing a structure of an image pickup apparatus of a first embodiment of the present invention.

FIGS. 1A and 1B are block diagrams showing a structure of an image pickup apparatus 100 that is a first embodiment of the present invention. In FIGS. 1A and 1B, the image pickup apparatus 100 includes the following components: a photographing lens 310; an iris 312; an image pickup element 14 for converting an optical image into an electric signal; an A/D converter 16 for converting an analog signal output of the image pickup element 14 into a digital signal; a timing generation circuit 18 that supplies a clock signal and a control signal to the image pickup element 14, the A/D converter 16 and a D/A converter 26 and is controlled by a memory control circuit 22 and a system control circuit 50; and an image processing circuit 20 for applying pixel interpolation processing or color conversion processing to data from the A/D converter 16 or data from the memory control circuit 22. The memory control circuit 22 controls the A/D converter 16, the timing generation circuit 18, the image processing circuit 20, an image display memory 24, the D/A converter 26, a memory 30 and a compression and expansion circuit 32. The image pickup apparatus 100 further includes image display memory 24; a D/A converter 26; an image display unit 28, which consists of TFT, LCD or the like and is capable of arbitrarily turning on/off display of an image, for displaying image data for display written in the image display memory 24; a memory 30 for storing photographed still images and moving images; a compression and expansion circuit 32 for compressing and expanding image data stored in the memory 30 by adaptive discrete cosine transform (ADCT) or the like; an exposure control unit 40 for controlling the shutter 12; a distance measurement unit 42 for controlling focusing of the photographing lens 310; a zoom control unit 344 for controlling zooming of the photographing lens 310; a photometry unit 46; a flash 48 having a floodlighting function of AF supplementary light and a flash light intensity control function; the system control circuit 50 for controlling the entire image pickup apparatus 100; a memory 52 for storing a constant, a variable, a program and the like for operation of the system control circuit 50; a notification device 54 that is constituted by, for example, a combination of an LCD, an LED, a sound element and the like and notifies an operation state, a message, start-up and the like of an image pickup apparatus using characters, images, voices and the like according to execution of a program in the system control circuit 50; an electrically erasable and recordable nonvolatile memory 56 such as an EEPROM; operations units 60, 62, 64, 66, 68 and 70 for inputting various operation instructions of the system control circuit 50; an electric power source control unit 80 that is constituted by a battery detection circuit, a DC-DC converter, a switch circuit for switching a block to be energized, and the like, performs detection of presence or absence of insertion of a battery, a type of a battery and a residual amount of a battery, controls the DC-DC converter based on a detection result and an instruction of the system control circuit 50, and supplies a necessary voltage to each unit including a recording medium for a necessary period; connectors 82 and 84; an electric power source 86 consisting of a primary battery such as an alkaline battery or a lithium battery, a secondary battery such as a NiCd battery, a NiMH battery or a Li battery, an AC adapter and the like; interfaces 90 and 94 with recording media such as a memory card and a hard disk; connectors 92 and 96 for connection with recording media such as a memory card and a hard disk; a recording medium attachment and detachment detection unit 98 for detecting whether or not a recording medium 200 or 210 is inserted in the connector 92 and/or 96; an optical finder 104; a communication unit 110 having various communication functions such as RS232C, USB, IEEE1394, P1284, SCSI, a modem, a LAN and wireless communication; a connector or, in the case of wireless communication, an antenna 112 for connecting the image pickup apparatus 100 with other equipment by the communication unit 110; recording media 200 and 210 such as a memory card and a hard disk; recording units 202 and 212 constituted by a semiconductor memory, a magnetic disk and the like; interfaces 204 and 214 with the image pickup apparatus 100; and connectors 206 and 216 for connection with the image pickup apparatus 100.

Figure 2:
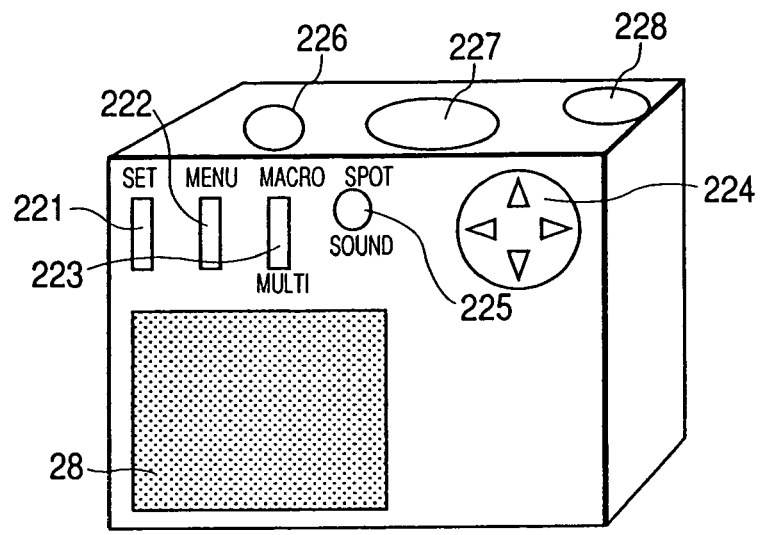
FIG. 2 is an external view of the image pickup apparatus of the first embodiment.

FIG. 2 is a perspective view of the image pickup apparatus of this embodiment. A mode dial switch 227 (60) can switch and set each function mode such as an electric power source off mode, an automatic photographing mode, a manual photographing mode, a panoramic photographing mode, a moving image reproduction mode, a reproduction mode and the like. For example, it is possible to start up the image pickup apparatus in the reproduction mode for reproducing an already stored image by selecting a position of the dial 227 to select the reproduction mode. In addition, it is possible to start up the image pickup apparatus in a photographing mode for photographing a subject by selecting a position of the dial to select the manual photographing mode. A photographed image of the image pickup apparatus is displayed on the image display unit 28, which is hereinafter referred to as LCD because an LCD (liquid crystal display) is usually used.

As buttons corresponding to operation buttons of the operation unit 70, there are a set button 221, a menu button 222, a macro/multi button 223, a cross button 224, a spot/sound recording and reproducing button (hereinafter referred to as SOUND button) 225 and a shutter button 228.

Here, in the button to which two names are allocated, such as the buttons 223 and 225, a latter function of the functions indicated by the two names is effective if a photographed image is displayed on the liquid crystal display; otherwise, the former function is effective. Element 226 is a speaker whose sound can be controlled in response to an operation of the group of operation buttons 70.

Next, a flow of processing of this embodiment will be described with reference to the flow charts of FIGS. 3, 4A, 4B, 5 and 6.

Figure 3:
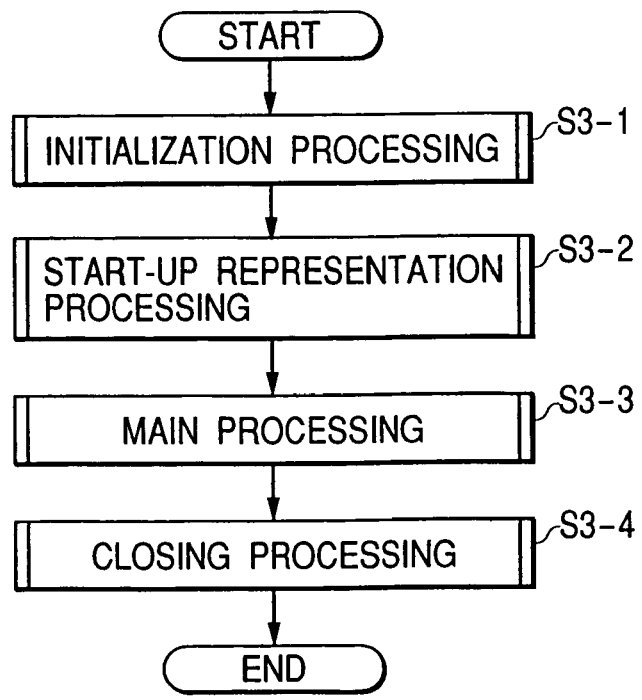
FIG. 3 is a flow chart of main processing.

FIG. 3 is a flow chart showing main processing for controlling the image pickup apparatus of this embodiment. Initialization processing required for starting up and controlling the image pickup apparatus is performed in step 3-1 (which is represented as S3-1 in the figure; same for other steps), and picture image display and sound processing for indicating that the image pickup apparatus has been started up is performed in step 3-2. Processing of step 3-2 will be described in detail with reference to FIG. 6.

After the representation processing for indicating start-up is performed, main processing for controlling the image pickup apparatus is executed in step 3-3. In the main processing, necessary processing is performed according to an event that has occurred in the image pickup apparatus, for example, a button is pressed, a residual amount of a battery is running short, or the like. However, since the main processing itself is not important in this embodiment, its detailed description is omitted. After the main processing ends, necessary closing processing is performed in step 3-4, and the control of the image pickup apparatus ends.

Figure 6:
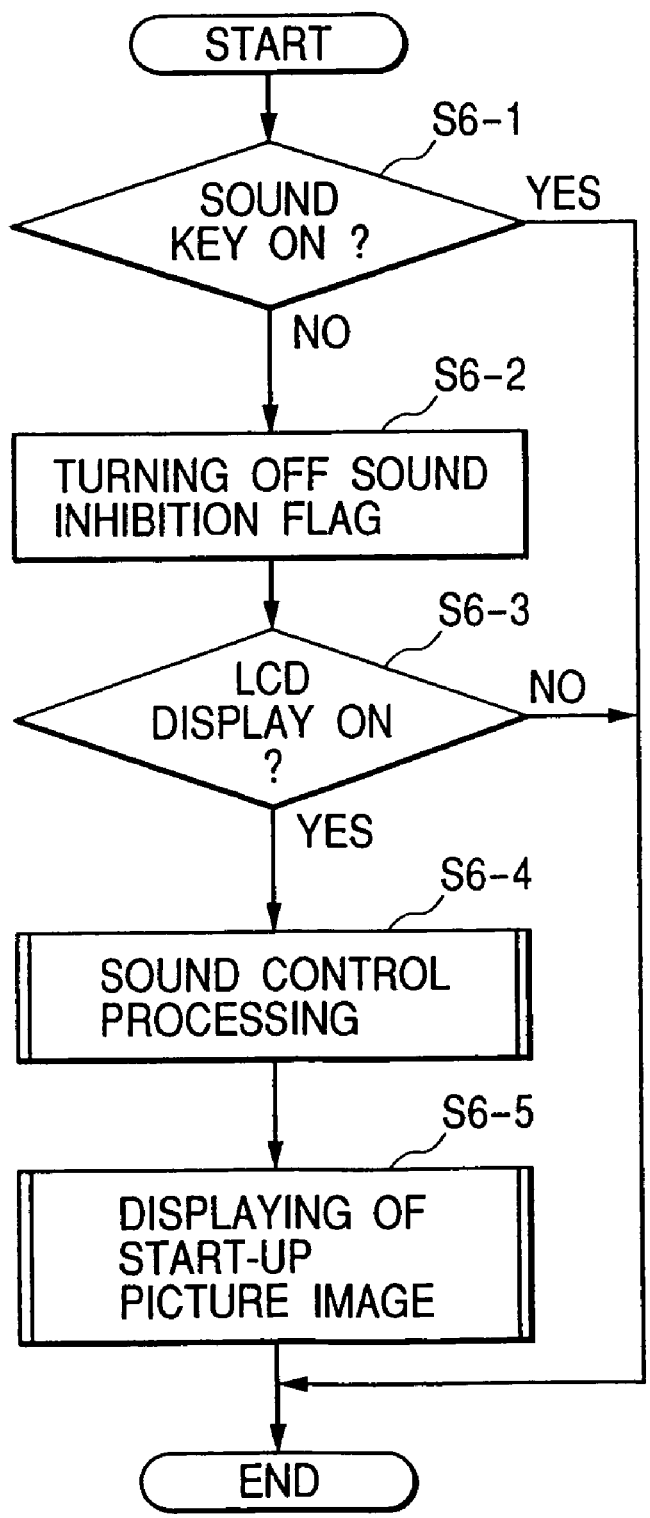
FIG. 6 is a flow chart of processing for sound control.

FIG. 6 is a flow chart for explaining processing for selecting a start-up operation of the image pickup apparatus according to an operation state of the SOUND button 225 at the start-up of the image pickup apparatus in step 3-2. In step 6-1, detection of input from each button is performed through the operation unit 70 from the system control circuit 50. That is, it is judged whether the SOUND button 225 is pressed or not. Here, if the SOUND button 225 is pressed, a sound inhibition flag is set in an ON state to inhibit predetermined picture image display on the LCD as well as output of predetermined sound (voice, electronic sound, start-up sound, operation sound after start-up or the like) from the speaker 26 at the start-up of the image pickup apparatus and ends the processing. If it is judged in step 6-1 that the SOUND button 225 is not pressed, the processing advances to processing of step 6-2 to keep the sound inhibition flag as set in an OFF state. That is, predetermined sound indicating the start-up of the image pickup apparatus 100 is outputted as the image pickup apparatus 100 is started up. In addition, the sound inhibition flag is initialized to be in an output inhibition OFF state in the processing of step 3-1. Moreover, in the state in which a system stored in the memory 30 is started up, it is possible to refer to the sound inhibition flag from the program of system control.

In this embodiment, whether it is necessary to perform LCD display after start-up is judged. Since the image display unit 28 is capable of controlling ON/OFF of the image display unit 28 according to an instruction of the system control circuit 50 as described above, for example, if the image display unit 28 is OFF at the end of the preceding system control of the image pickup apparatus 100, OFF control of the image display unit 28 can be performed immediately after start-up by storing a state at the end of the preceding system control in the nonvolatile memory 56. In this embodiment, it is possible to judge from a memory state of the nonvolatile memory 56 whether or not it is necessary to perform LCD display. If it is judged in step 6-3 that it is unnecessary to perform LCD display after starting up the image pickup apparatus 100 (if the image display ON/OFF switch 66 is OFF), predetermined display of a picture image on the LCD or a predetermined sound operation at the start-up is not performed. Moreover, if it is determined here that LCD display after starting up the image pickup apparatus 100 is performed, the processing advances to step 6-4, where sound indicating that the image pickup apparatus 100 is started up is outputted based on information stored in the nonvolatile memory 56. Simultaneously with this sound output operation, in step 6-5, JPEG data for a start-up picture image stored in the memory 30 is expanded by the compression and expansion circuit 32 and developed as an image in a memory for display. The image is displayed as a start-up picture image to end this processing.

Figure 4A:
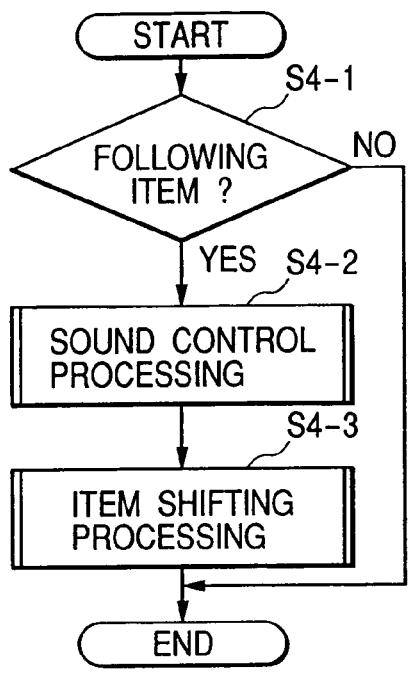
FIG. 4A is a flow chart of processing for sound control.
Figure 4B:
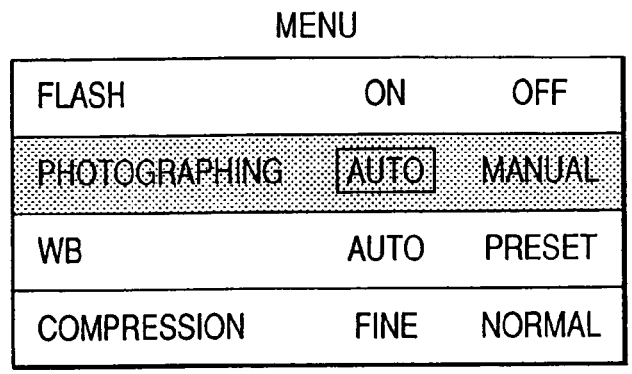
FIG. 4B shows an example of a setting picture image of the image pickup apparatus.

Next, processing for outputting sound according to an operation of the button 224 will be described with reference to FIGS. 4A and 4B. In this example, set items are vertically arranged in a menu as shown in FIG. 4B. When the lower button of the cross button 224 is depressed, the depressing of the button is accepted if there is an item below a currently selected item; otherwise the depressing of the button is not accepted. However, this is an example in which sound is outputted when it is judged that an operation is accepted. For example, the operation of this embodiment is not affected even if, when the lower button is depressed and there is no item below a currently selected item, the depressing of a button is made acceptable so that selection of an item moves to an uppermost item. In menu controlling management, the number of items of a menu and an order of items currently selected for display are managed on the memory 30, and it is judged in step 4-1 whether there are more items below an item currently selected. Here, if it is judged that a lowermost item has already been selected and there is no item below it, sound control is never performed. In FIG. 4A, if it is judged that there is an item below the currently selected item in step 4-1, the processing advances to step 4-2 and sound control processing is performed. Thereafter, item shifting processing of the menu is performed in step 4-3, a menu picture image is drawn and the menu picture image of the image display unit 28 is updated. Step 4-2 will be described with reference to FIG. 5.

Figure 5:
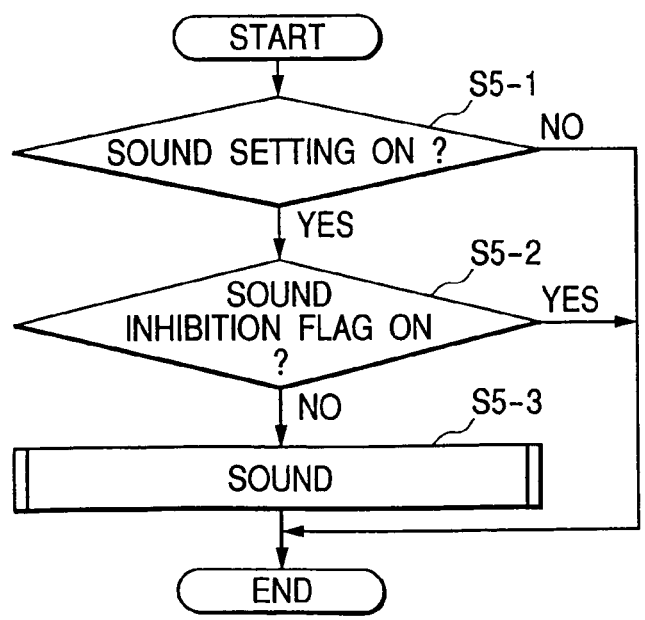
FIG. 5 is a flow chart of processing for sound control.

FIG. 5 shows processing for outputting sound indicating that the image pickup apparatus has been started up at the start-up or outputting sound when an operation of a button is accepted. In this embodiment, ON/OFF of sound output is set using a menu, and set items are stored in the nonvolatile memory 56. First, in step 5-1, it is checked according to contents of the nonvolatile memory 56 if the image pickup apparatus is set to output sound. If sound output is set OFF, actual sound control is not performed and the processing of FIG. 5 ends. If sound output is set ON, the processing advances to step 5-2, where the sound inhibition flag set by the processing of step 6-1 of FIG. 6 is referred to. That is, if the SOUND button 225 is depressed and the sound inhibition flag is ON, the subsequent processing is skipped and sound is never outputted. On the other hand, if the SOUND button 225 is not depressed and the sound inhibition flag is OFF, the processing advances to step 5-3 and the sound element provided in the notification device 54 is controlled and sound is outputted.

As described above, according to this embodiment, it is possible to select according to an operation state of buttons or the like at the start-up whether or not output of start-up sound indicating the start-up of the image pickup apparatus, operation sound after the start-up and image picture display by the LCD should be performed. Consequently, it is possible to eliminate the trouble of starting up the image pickup apparatus once to change settings to deal with a situation in which it is not desired to output sound in starting up and operating an image pickup apparatus or a situation in which it is not desired to display a start-up picture image before such a situation occurs when it is known that an operator is in such a situation. Further, in this embodiment, it is possible to inhibit sound by turning ON the sound inhibition flag if the SOUND button 225 is depressed not only in the case in which the image pickup apparatus is started up, but also in the case in which sound output is set ON.

Second Embodiment

In the first embodiment, processing of sound control is described, and sound indicating the start-up of the image pickup apparatus 100 and sound outputted according to acceptance of a button operation are not discriminated in the description. As a developed form of the first embodiment, processing for making sound outputted at the start-up different from sound outputted by a button operation after the start-up may be performed. In addition, in the first embodiment, the sound element control is simply performed. However, for example, it is easy to develop WAVE data in the memory 30 and reproduce it using a speaker provided in the notification device 54, and no limitation is applied to a kind of sound to be outputted.

Third Embodiment

In the first embodiment, operating conditions of sound and start-up picture image display in starting up the image pickup apparatus 100 are changed according to an operation state of the SOUND button 225. However, for example, it is also possible to make the IMAGE DISPLAY UNIT 28 rotatable and select conditions of sound and start-up picture image display according to a rotation state of the IMAGE DISPLAY UNIT 28. An example of this will be hereinafter described as a third embodiment with reference to FIGS. 7A to 7D.

An image pickup apparatus shown in FIGS. 7A to 7D is constituted such that the image display unit 28 (image display unit) can be rotated and retracted in a back of a main body of the image pickup apparatus using a hinge 75. A rotation angle of the hinge 75 can be judged by the system control circuit 50 based on a signal of a not-shown detection unit. FIGS. 7A to 7D show states of such the image pickup apparatus.

In FIGS. 7A to 7D, operation states of the image pickup apparatus are shown, which change from a state in which the image display unit 28 is retracted in the back of the main body as shown in FIG. 7A, to a state in which the hinge is opened and the image display unit 28 continues to face the back direction as shown in FIG. 7B, and further, from a state in which the hinge is rotated and the image display unit 28 faces the front as shown in FIG. 7C, to a state in which the hinge is closed again and retracted in the back of the main body and the display surface of the image display unit 28 is exposed as shown in FIG. 7D. In this case, if the system control circuit 50 detects the state of the image display unit 28 as shown in FIG. 7A by using a not-shown detection element, it turns ON the sound inhibition flag to perform processing for inhibiting output of predetermined sound indicating that the image pickup apparatus has been started up, output of operation sound after the start-up and display of start-up picture image. In the states of FIGS. 7B to 7D, the system control circuit 50 turns OFF the sound inhibition flag to perform processing for executing output of predetermined sound indicating that the image pickup apparatus has been started up, output of operation sound after the start-up and display of start-up picture image (the same processing as step 6-1 of FIG. 6).

As described above, in this embodiment, if the image pickup apparatus is started up with the rotatable image display unit 28 retracted, control for inhibiting output of sound and start-up picture image display is performed. Further, an operator usually retracts the image display unit 28 at the point when the operator finishes using the image pickup apparatus. In this case, the image display unit 28 will often be started up next in the state in which it is retracted. Thus, it is evident that the trouble of the operation for inhibiting sound and start-up picture image display can be further eliminated.

As described above, according to the present invention, it is possible to determine according to an operation state of buttons or the like at the start-up whether or not output of start-up sound indicating that the image pickup apparatus has been started up and operation sound after the start-up and display of a start-up picture image or the like should be performed. Consequently, it is possible to eliminate the trouble of starting up the image pickup apparatus once to change settings in advance so as to deal with a situation in which it is not desired to output sound in operating the image pickup apparatus or a situation in which it is not desired to display a start-up picture image before such situation occurs when it is known that an operator will be in such a situation.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
a sound output unit, adapted to output a predetermined sound when said image pickup apparatus is activated;
a display unit, adapted to effect a predetermined display when said image pickup apparatus is activated; and
a control unit, adapted to detect a state of the display unit when said image pickup apparatus is activated, and based on a detection result, to inhibit said sound output unit from outputting the predetermined sound and inhibit said display unit from effecting the predetermined display, wherein said control unit inhibits output of the predetermined sound and inhibits effecting of the predetermined display in a case that said control unit detects that the display unit is in a retracted state.

* * * * *